United States Patent [19]

Giger et al.

[11] Patent Number: 5,638,458
[45] Date of Patent: Jun. 10, 1997

[54] AUTOMATED METHOD AND SYSTEM FOR THE DETECTION OF GROSS ABNORMALITIES AND ASYMMETRIES IN CHEST IMAGES

[75] Inventors: Maryellen L. Giger, Elmhurst; Samuel Armato; Heber MacMahon, both of Chicago, all of Ill.

[73] Assignee: Arch Development Corporation, Chicago, Ill.

[21] Appl. No.: 159,133

[22] Filed: Nov. 30, 1993

[51] Int. Cl.⁶ .................................................. G06K 9/00
[52] U.S. Cl. ..................... 382/132; 382/172; 382/199; 382/266; 382/271; 382/288
[58] Field of Search ..................... 382/6, 18, 19, 382/22, 28, 51, 128, 130, 131, 132, 172, 190, 195, 199, 206, 257, 266, 270, 271, 273, 288; 364/413.13, 413.19, 413.22, 413.23

[56] References Cited

U.S. PATENT DOCUMENTS

| | | | |
|---|---|---|---|
| 4,907,156 | 3/1990 | Doi et al. | 382/6 |
| 5,133,020 | 7/1992 | Giger et al. | 382/6 |
| 5,319,549 | 6/1994 | Katsuragawa et al. | |
| 5,343,390 | 8/1994 | Doi et al. | 382/6 |
| 5,345,513 | 9/1994 | Takeda et al. | 382/6 |

OTHER PUBLICATIONS

"Image Feature Analysis and Computer–Aided Diagnosis in Digital Radiography: Automated Analysis of Sizes of Heart and Lung in Chest Images", Nakamori et al., Med. Phys. 17(3), May/Jun. 1990, 1990 Am. Assoc. Phys. Med., pp. 342–350.

"Localization of Inter–Rib Spaces for Lung Texture Analysis and Computer–Aided Diagnosis in Digital Chest Images", Powell et al., Med. Phys. 15(4), Jul./Aug. 1988, 1988 Am. Assoc. Phys. Med., pp. 581–587.

*Primary Examiner*—Leo Boudreau
*Assistant Examiner*—Phuoc Tran
*Attorney, Agent, or Firm*—Oblon, Spivak, McClelland, Maier & Neustadt, P.C.

[57] ABSTRACT

A method for the automated detection of gross abnormalities and asymmetries in chest images, including generating image data from radiographic images of the thorax. The image data are then analyzed in order to produce the boundaries of the aerated lung regions in the thorax. This analysis comprises location of the mediastinum and lung apices, iterative global thresholding with centroid testing of contours, local thresholding on regions along initial contours of the aerated lung, correction for regions near the costo- and cardiophrenic angles in the chest, analysis of the areas and density distribution within the aerated lung regions in the chest and determination of the likelihood of the presence of a gross abnormality or asymmetry. Final output could be the computer determined contours of the lungs or the likelihood for abnormality.

48 Claims, 10 Drawing Sheets

AUTOMATED METHOD AND SYSTEM FOR THE DETECTION OF GROSS ABNORMALITIES AND ASYMMETRIES IN CHEST IMAGES

The present invention was made in part with U.S. Government support under NIH grants/contracts CA48985 and CA09649; Army grant/contract DAMD 17-93-J-3021; and American Cancer Society grant/contract FRA-390. The U.S. Government has certain rights in the invention.

BACKGROUND OF THE INVENTION

1. Field of the Invention

The invention relates to a method and system for the computerized automatic detection of gross abnormalities and asymmetries in chest images, and more specifically to a method and system for detection in digital chest radiographs. Asymmetries are detected by multiple stages of global and local gray-level thresholding along with contour detection. Abnormalities are detected based on deviation from expected symmetries between the left and right lungs, using such features as size and density of the aerated lung regions.

2. Discussion of the Background

Computer-aided diagnosis (CAD) has potential to become a valuable tool for detecting subtle abnormalities in chest radiographs. It would be useful for a CAD scheme to detect more large-scale abnormalities, which commonly cause abnormal asymmetry on the radiograph. In general, asymmetric abnormalities appear as a substantial decrease in the area of aerated lung in one hemithorax. This would include interstitial infiltrates, dense air space infiltrates, pleural effusions, large masses, or unilateral emphysema.

Most CAD schemes currently employed in digital chest radiography are specific to one particular and often localized pathology, for example lung nodule, interstitial infiltrate, pneumothorax or cardiomegaly. These schemes often utilize a priori information regarding the "normal" appearance of the ribcage, diaphragm and mediastinum in a digital chest radiograph. A potential problem arises when the nature of the thoracic abnormality is such that it substantially affects the volume of the lungs. An abnormality of this type will usually cause a decrease in the aerated lung region (i.e. the high optical density associated with the normally low attenuation of the lungs) as projected onto the radiograph. This can substantially alter the overall morphology of the chest, resulting in potential failure of such CAD schemes. Detection of these abnormalities may also prove useful in prioritizing abnormal cases in a picture archiving and communication system (PACS).

The present application discloses a technique for the automated detection of abnormal asymmetry in digital chest radiographs. The method consists of an iterative global thresholding technique in conjunction with a contour detection algorithm to construct an initial set of contours around the two projected aerated lung regions in a chest image. In order to identify the lungs more accurately, a local thresholding technique is then applied within regions of interest (ROIs) centered along the contours that result from the global thresholding. The areas and densities of the two lung regions identified in this manner can be compared in order to determine whether an asymmetric abnormality is present.

SUMMARY OF THE INVENTION

Accordingly, an object of this invention is to provide an automated method and system for detecting and displaying gross abnormalities and asymmetries in medical images of the chest.

Another object of this invention is to provide an automated method and system for the iterative gray-level thresholding of lung regions in a chest image.

Another object of this invention is to provide an automated method and system for the local thresholding of lung regions in a chest image.

Another object of this invention is to provide an automated method and system for defining the edge of the aerated lung regions by using features based on the anatomic structure of the lung and its surround.

Another object of this invention is to provide an automated method and system for the detection of lung boundaries within a radiographic image of the thorax.

Another object of this invention is to provide an automated method and system for the extraction of objects (features) within the lung regions in chest images of the thorax by using size and shape of the aerated lung regions.

Another object of this invention is to provide an automated method and system for distinguishing abnormal regions from normal anatomy based on asymmetries between the left and right lung regions.

These and other objects are achieved according to the invention by providing a new and improved automated method and system in which an iterative, multi-level gray level thresholding is performed, followed by a local thresholding and an examination of regions based on anatomically-based features, and then followed by an analysis of the possible asymmetries. For example, asymmetric abnormalities may present on the chest radiograph as a decrease in the area of aerated lung in one hemithorax and in different degrees of subtlety due to size and composition. In order to allow the various abnormalities to be detected, the aerated areas are analyzed and compared with the opposing hemithorax.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
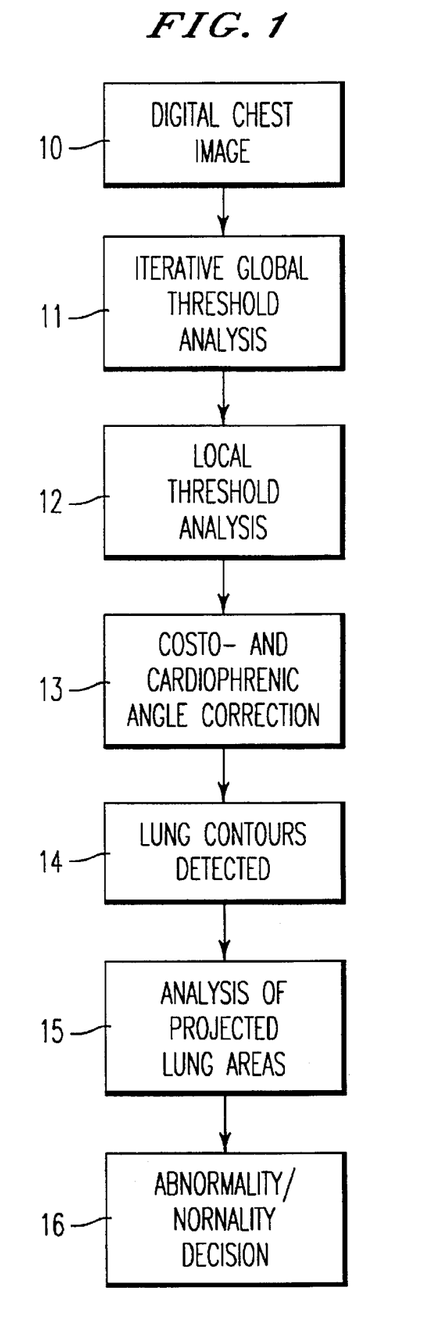
FIG. 1 is a schematic diagram illustrating the automated method for detection of asymmetric abnormalities according to the invention.

Referring now to the drawings, and more particularly to FIG. 1 thereof, a schematic diagram of the automated method for the detection of gross abnormalities and asymmetries in chest images is shown. The overall scheme includes an initial acquisition of a radiograph of the thorax and digitization to produce a digital chest image (step 10). Detection of aerated lung boundaries is performed initially using an iterative, global thresholding technique (step 11) which includes a centroid test. After which, the initial contours are used for positioning of the ROIs for a local thresholding technique (step 12). After the local thresholding procedure, there is a correction for the costo- and cardiophrenic angle (step 13). The lung contours are then determined (step 14). By analyzing the resulting contours and the projected lung areas (step 16), the chest image is assigned a likelihood of having a gross abnormality or asymmetry (step 16).

Figure 2:
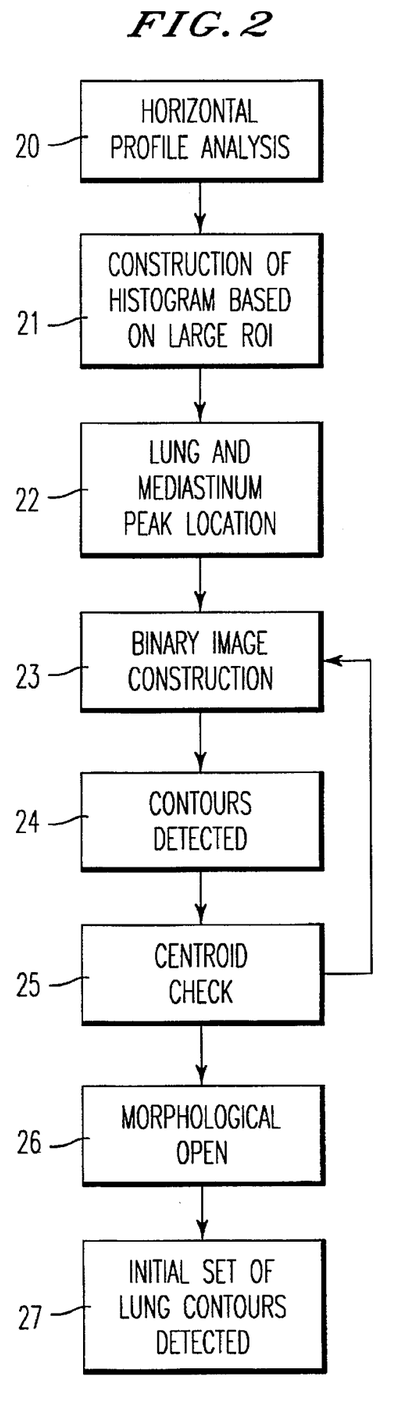
FIG. 2 is a schematic diagram illustrating the automated method for the iterative, global thresholding for the detection of the boundary of the thorax according to the invention.

FIG. 2 shows a schematic diagram illustrating the automated method for the iterative global thresholding for the detection of the boundary of the thorax. Initially, horizontal gray-level profiles in the image are calculated (step 20) and used to determine the location of the mediastinum and the lung apices. This information is used throughout the scheme in order to differentiate the right hemithorax from the left and to identify an upper bound in the image that prevents the contours from growing along the neck. This information is required for each image to compensate for differences in patient positioning.

A global gray-level histogram is used to initially segment the lungs in the chest image (step 21). In an effort to obtain more uniform histograms, the calculation of the histogram is effectively centered over the thorax. In this example, a 181×141 pixel region centered 70 pixels from the top of the image, i.e. over the thorax, was chosen. Step 22 of the method shown in FIG. 2 where the lung and mediastinum peaks are located will now be described. The typical histogram (FIG. 3) resulting from such a region exhibits two peaks 30 and 31: one centered over lower gray values that corresponds to pixels predominantly within the lungs, and another centered over higher gray values that corresponds to pixels predominantly in the mediastinum, in the ribcage edge, and, presumably, in any asymmetric abnormality that may be present, respectively.

The goal with regard to performing global threshold analysis, therefore, is to use the histogram in order to determine an appropriate gray value that separates the gray values belonging to pixels within the aerated lung region from those that are located outside the lungs. The task of determining an appropriate threshold proved to be impossible based on the selection of a single gray value. Values were either too low and the resulting binary image insufficiently captured the lung regions, or the values were too high and the lung regions merged with regions outside the lungs; in most cases, a certain threshold value resulted in the former condition in one area of the lung region and in the latter condition in another area.

Figure 3:
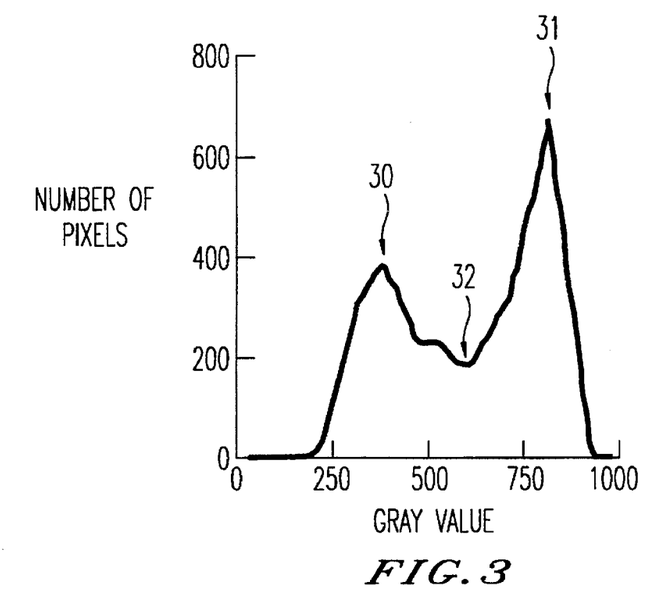
FIG. 3 is a graph illustrating the gray-level histogram of a chest image indicating the computer-determined location of the lung peak and the minimum between the lung and mediastinum peaks; This represents the range of gray values used in the iterative thresholding technique.

This problem is overcome by introducing an iterative global threshold scheme. Instead of choosing one gray-level threshold value, a range of values is used in succession. The running slope (first derivative) of the global gray-level histogram is used in order to identify the gray value at which the peak (30 in FIG. 3) corresponding to the lung regions occurs and the gray value at which the minimum between the lung and mediastinum peaks occurs (32 in FIG. 3). A number of equally-spaced gray values between this peak and minimum are then each used in a threshold iteration. In this example 7 gray values were detected. A typical histogram along with the range of gray-level thresholds used during the iterative global gray-level thresholding is shown in FIG. 3.

The iterations are used to create a binary image (step 23). The first iteration creates a binary image by using the smallest of the seven gray values (i.e. the highest optical density of the range) as the threshold limit. Pixels are turned "on" in the binary image if the corresponding pixel in the image has a gray value greater than a certain level above the background level, such as 10, but less than this threshold limit. FIGS. 4A–4E illustrates, schematically, the binary images that result from applying four different gray-level thresholds to a chest image.

Figure 4A:
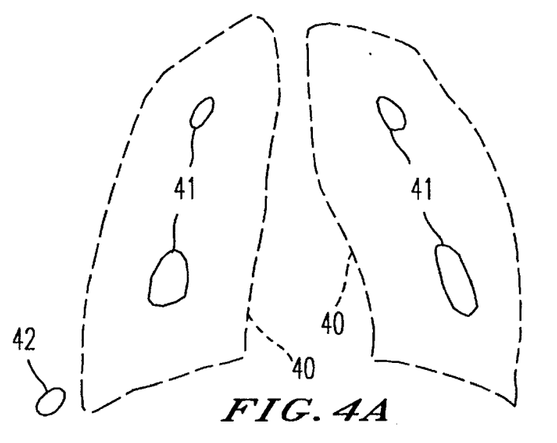
FIGS. 4A–4E shows binary images created by thresholding a chest image at different gray values.

In FIG. 4A, the result of thresholding at a smaller threshold is shown. The actual lung boundary 40 is shown for reference only. The thresholding produces a number of regions 41 within the lung boundary 40 and a region 42 outside of the boundary 40. The region 42 is eliminated by a centroid check described below.

The resulting binary image is sent to the contour detection routine, which utilizes a connectivity scheme (such as 8-point) to identify contours representing the boundaries of groups of contiguous "on" pixels (step 24). Connectivity schemes are described, for example, in "Automatic segmentation of liver structure in CT images," by K. Bae, M. L. Giger, C. T. Chen, and C. Kahn, (Medical Physics 20, 71–78 (1993)). The routine also calculates important geometrical properties of these contours, such as the centroid of the contour, contour compactness, contour length (in terms of pixels), and the area enclosed within the contour (in terms of pixels).

Figure 5:
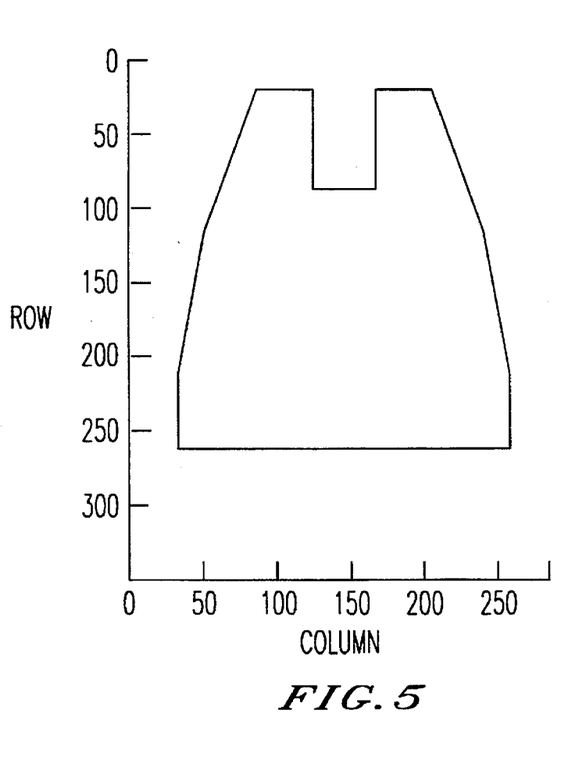
FIG. 5 is a graph showing the empirically-determined centroid limits plotted on image-based coordinates, where contours with centroids outside this limit are eliminated from the image.

The centroid of a contour is used to determine whether the pixels within that contour are within a region that is likely to contain lung (step 25). A "centroid limit" can be empirically constructed by analyzing the centroids of all contours resulting during all of the threshold iterations. The limit, shown in FIG. 5, is based on the spatial distribution in the image plane of the centroids of contours falling within the lung regions and the centroids of contours external to the lungs for 28 chest images. If the centroid of a contour falls outside this limit, the pixels enclosed by this contour are turned "off" (such as region 42 in FIG. 4A). These external regions are thus prevented from merging with regions within the lungs at later iterations where the threshold gray value is greater and the likelihood of such a merge is increased. This allows for the most complete identification of the lungs without also incorporating extraneous area.

Figure 4B:
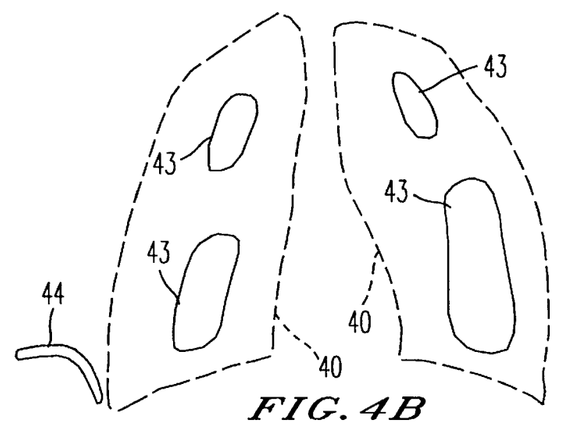
Figure 4C:
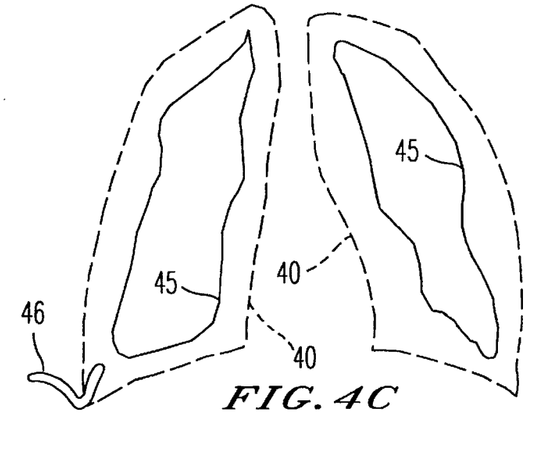
Figure 4D:
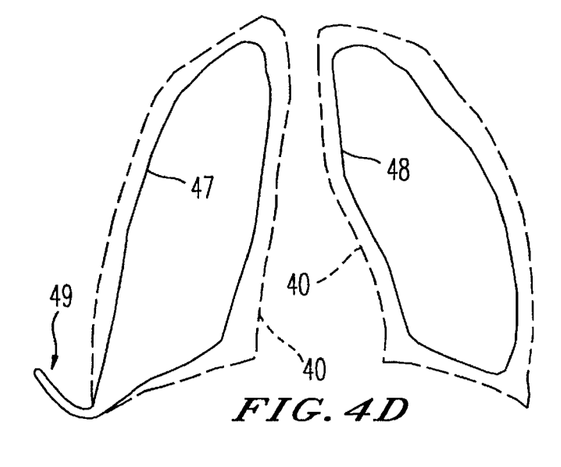

This process of thresholding to create a binary image, identifying contours, and turning pixels "off" based on a centroid check is repeated for each of the iterations, with the threshold gray value used to produce the binary image increasing at each iteration. FIGS. 4B–4D show the results of subsequent iterations. In FIG. 4B, larger regions 43 are determined within the lung boundary 40 along with a region 44 which is also eliminated by the centroid check. Larger regions 45 are determined within the lung boundary 40 shown in FIG. 4C. Also shown in FIG. 4C is a region 46 which contains pixels outside of the lung boundary 40, but is not eliminated by the centroid check as it has a centroid within the limit 51 as shown in FIG. 5. FIG. 4D shows an iteration at a higher pixel value where the regions 47 and 48 are now closely approximating the lung boundary 40. The iterative thresholding technique can be thought of as finding the perimeter of a mountain range at various heights, with lower threshold values being closer to the top of the mountain range.

It should be pointed out that a more strict centroid limit could be employed during the later iterations, since the spatial distribution of lung contours typically becomes more confined as the threshold level is increased. The stricter centroid limit shown as 51 in FIG. 5 could eliminate regions such as region 46.

Figure 4E:
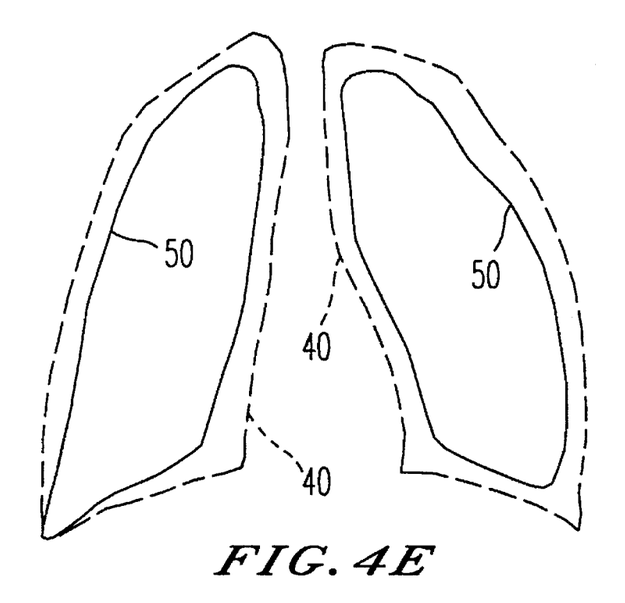

A morphological open operation with a 3×3 kernel is also applied during each of the final two iterations (step 26). The morphological open operation is described in, for example, *Image Analysis and Mathematical Morphology* by J. Serra (Academic, New York, 1982). This combination of an erosion filter followed by a dilation filter eliminates many of the slender artifacts that remain "on" in the binary image as a result of the process that turns "off" regions of the image based on the centroid check. Thus as shown in FIG. 4E, the morphological open operation can eliminate the slender portion 49 of region 48 to give contours 50. The final result of the global threshold iterations is an initial set of contours representing the aerated lung regions in the image (step 27).

Figure 6:
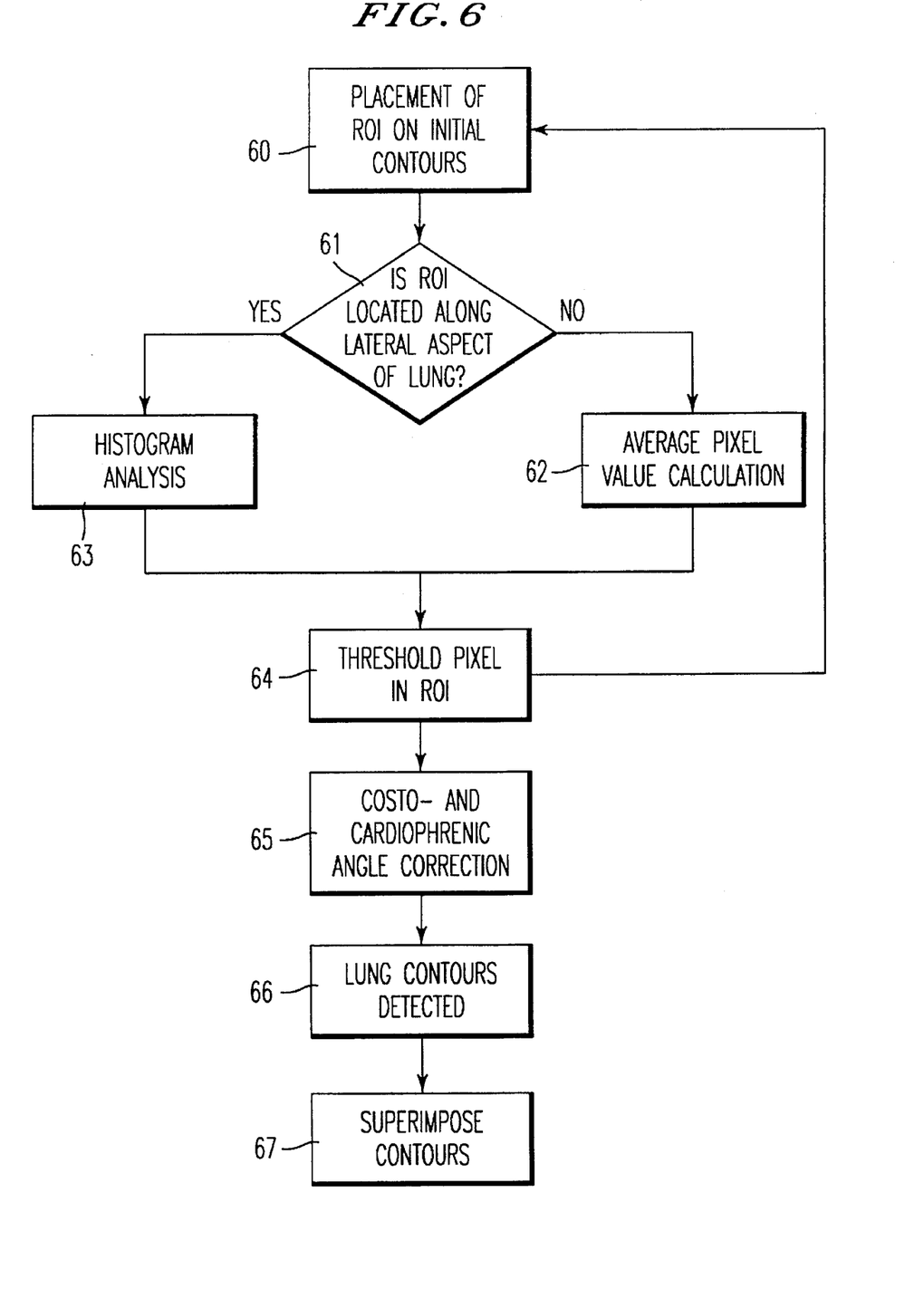
FIG. 6 is a schematic diagram illustrating the automated method for the local thresholding for the detection of the boundary of the thorax according to the invention.
Figure 7:
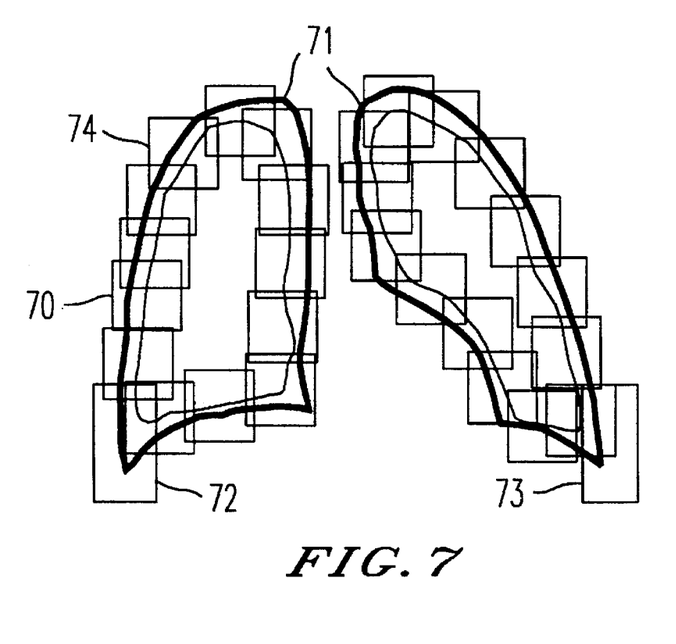
FIG. 7 is a schematic diagram showing the placement of ROIs for local threshold analysis along the initial contours that result from the iterative global threshold process.

It was found that these initial contours tended to under-represent the actual lung regions. Since increasing the largest threshold gray value produced more artifacts in the resulting contours, a local thresholding scheme is applied to the output of the global thresholding scheme. FIG. 6 illustrates schematically the method for the local thresholding. Overlapping ROIs pixels are centered along the initial contours (step 60). In this example ROIs of dimension 31×31 were centered at every thirtieth point. Other sizes and spacing are possible. FIG. 7 schematically shows the placement of ROIs 70 along the lung contours 71. The pixels within each ROI are then turned "on" or "off" to form a binary image based on a threshold gray value determined individually for each ROI.

As shown in FIG. 6, it is determined in step 61 whether the ROIs are located on a lateral aspect of the lung. For ROIs along the medial and diaphragmatic aspects of each lung region, the mean pixel value within the ROI is selected as the threshold (step 62). For ROIs along the lateral aspect, a gray level histogram is constructed (step 63), and the initial choice of threshold is set equal to the gray value at which the histogram minimum with the largest gray value occurs. The threshold value actually used for the lateral ROIs is then an average of the initial threshold values of the ROI and its two neighboring ROIs. Thus the threshold values for each of the ROIs is determined by repeating the operation for all ROIs (step 64).

Figure 8A:
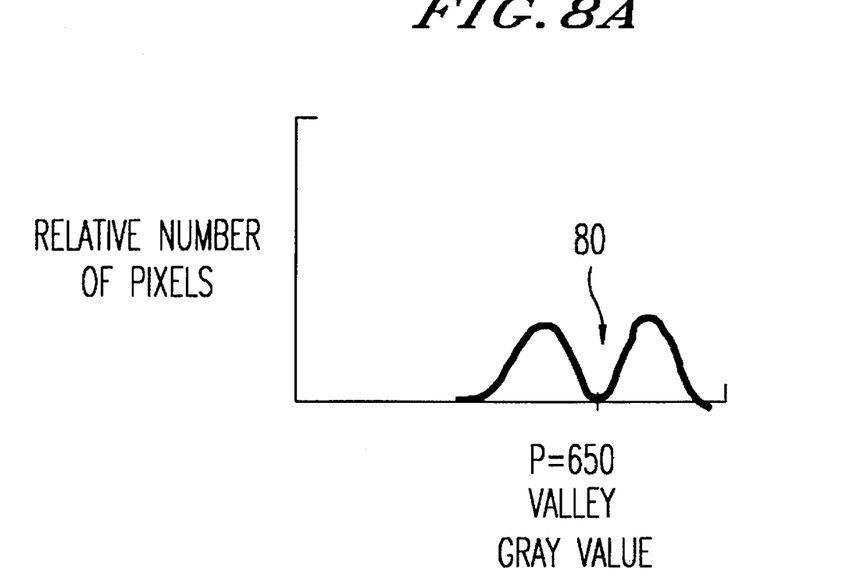
FIGS. 8A and 8B are diagrams illustrating local threshold analysis.
Figure 8B:
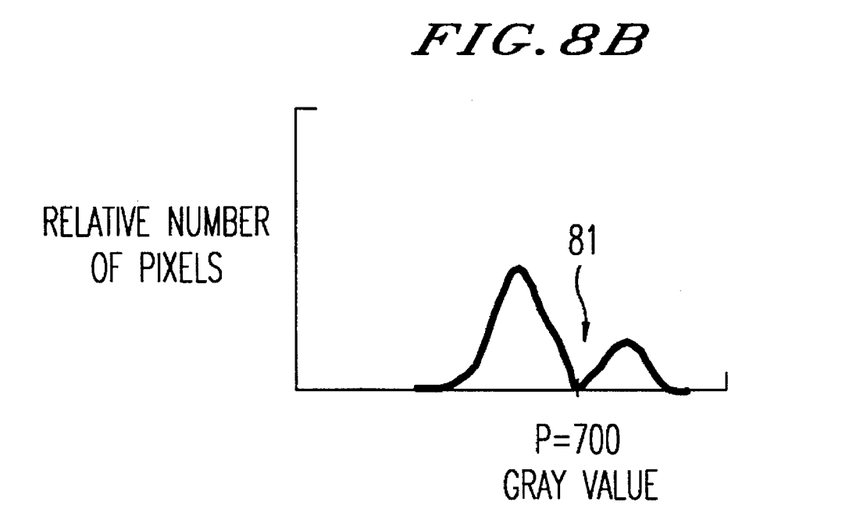

The local thresholding is described in more detail in FIG. 8A and 8B. FIG. 8A shows a histogram of a ROI such as 70 (see FIG. 7), while FIG. 8B shows a histogram of a ROI such as 74. The bimodal distribution results from the overlap of the contour, which produces valleys 80 and 81. In the local thresholding, the gray value $p_i$ of the center pixel of the ROI is replaced with one of two selected gray values depending on whether $p_{i<pvalley}$ or $p_{i \geq pvalley}$. Or, $$p(x,y) = \begin{cases} 1 \text{ if } p(x,y) \geq & \text{threshold cutoff of } ROI \\ & \text{centered at } p(x,y) \\ 0 \text{ if } p(x,y) < & \text{threshold cutoff of } ROI \\ & \text{centered at } p(x,y) \end{cases}$$

Instead of 1, p(x,y) could be left unchanged. This local thresholding thus provides a binary image.

The method, however, may under-represent the costophrenic angle and over-represent the cardiophrenic angle. To accommodate these important anatomical landmarks, two additional ROIs (72 and 73 in FIG. 7) are added to better capture the costophrenic angle, while the criterion for setting the threshold within the ROI overlaying the cardiophrenic angle was altered to yield a lower threshold value when necessary (step 65).

The binary image constructed by thresholding individual ROIs in this manner is sent to the contour detection routine, the morphological open operation is again applied, and the resulting final contours (step 66) are superimposed on the original image (step 67).

The analysis of the projected lung areas (step 15 in FIG. 1) will now be described. The calculated areas and densities of the final contours, corresponding to the projected areas of the aerated lung regions, can then used to make a decision regarding the presence of an asymmetric abnormality (step 16 in FIG. 1). These features are schematically described in FIGS. 9A and 9B.

Figure 9A:
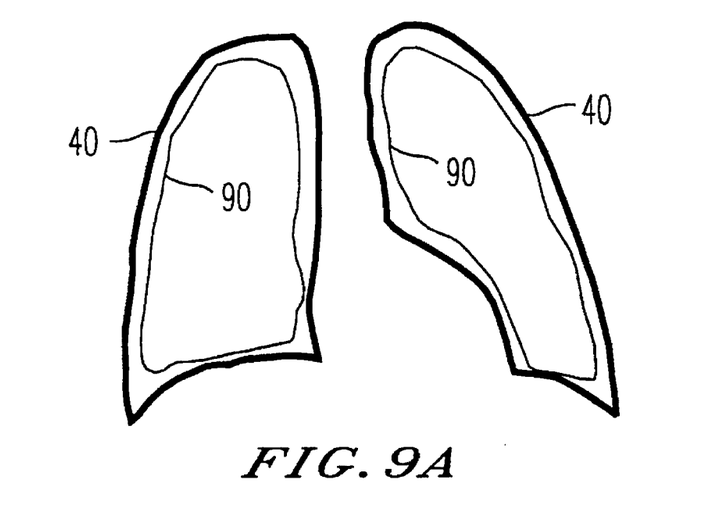
FIGS. 9A and 9B are schematics illustrating the features (area and density, respectively) extracted for use in the comparison of the left and right aerated lung regions.
Figure 9B:
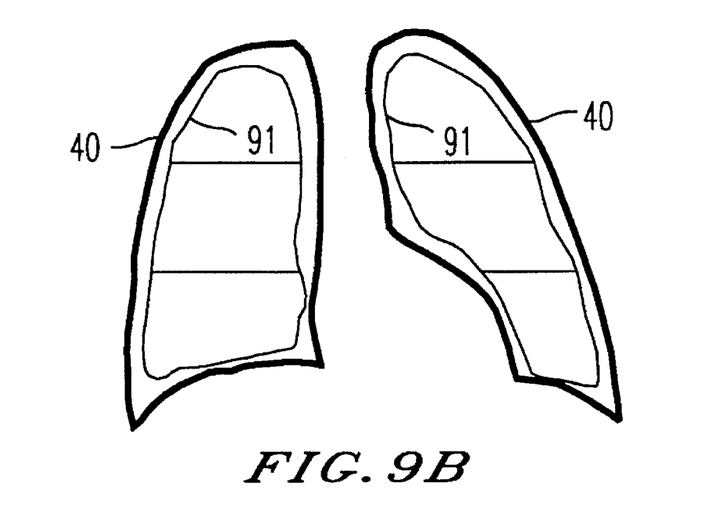
Figure 10:
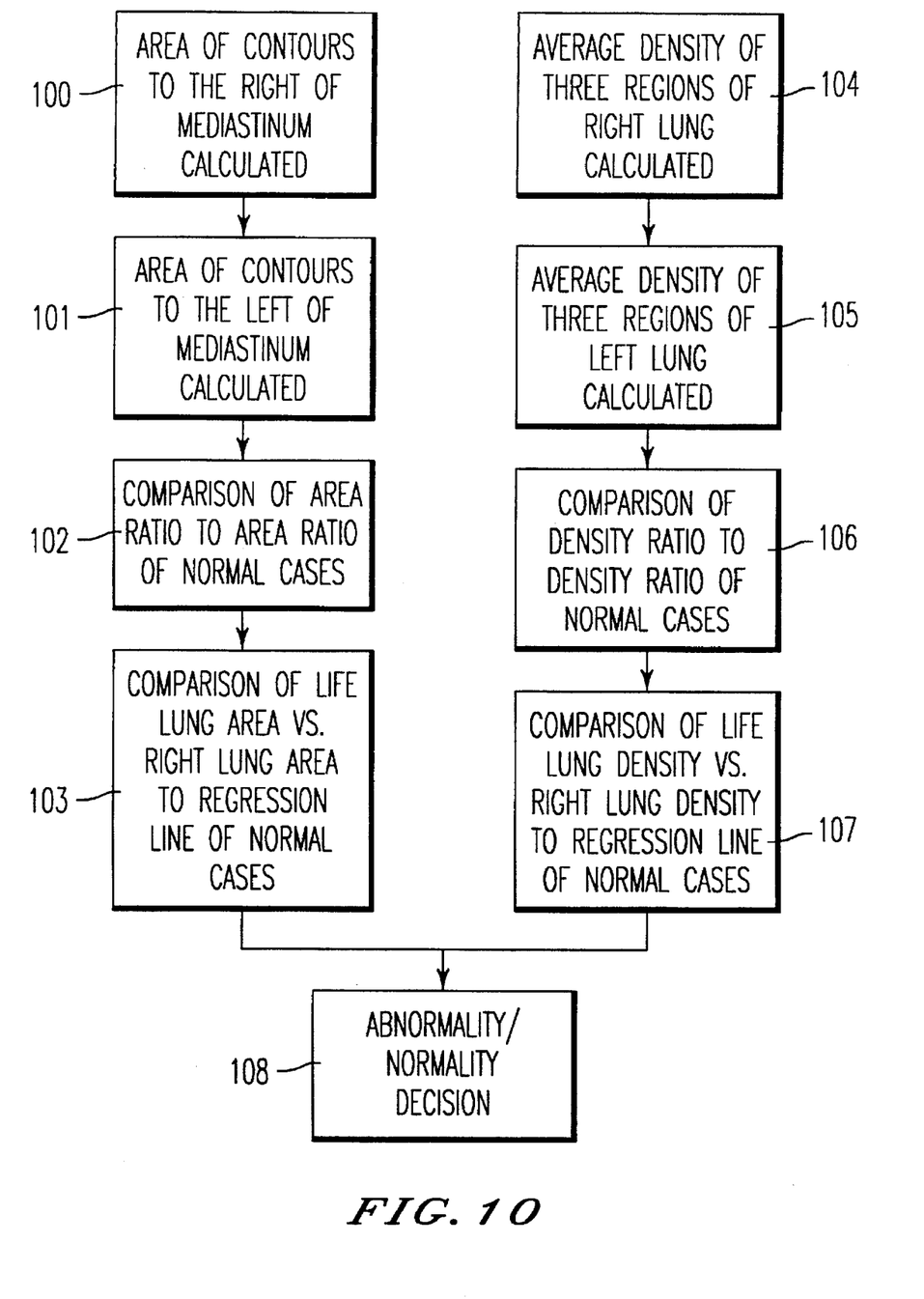
FIG. 10 is a schematic diagram illustrating the automated method for comparison of left and right lung regions and the determination of the presence of an abnormality.

In FIG. 9A, the determined contours 90 are shown along with the actual lung boundaries 40. The area of contours to the left and the right of the mediastinum (steps 100 and 101) (the area within each of the left and right lung contours) is calculated (i.e. the pixels are counted). The decision criterion is based on a comparison of the right lung area and left lung area (step 102), which are defined as the sum of the areas of all contours to the right and left of the mediastinum, respectively. FIG. 10 shows schematically the method for the comparison of the left and right aerated lung regions. Presumably, all contours outside the lung region are suppressed, and large abnormalities may result in the aerated portion of the lung being divided into two or more regions.

Figure 11:
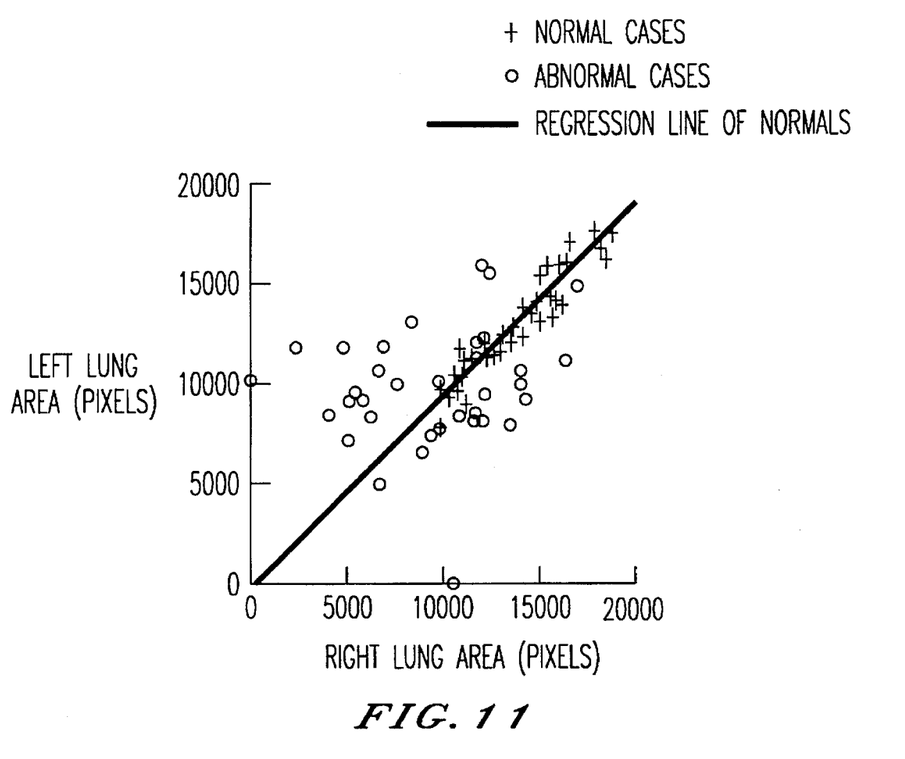
FIG. 11 is a graph of the left lung area plotted as a function of right lung area for 70 cases. The regression line shown is based on true normal cases only.
Figure 12:
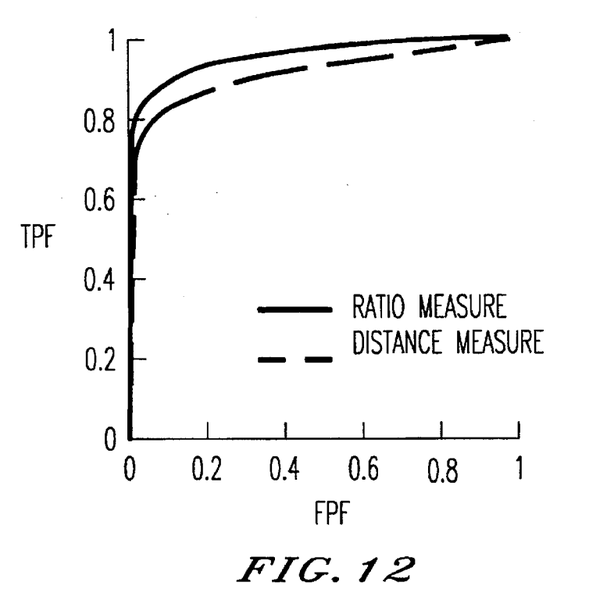
FIG. 12 is a graph illustrating the ROC curve showing the performance of the method in detecting gross abnormalities and asymmetries.

The scheme was applied to a database of 35 normal cases, and an average right lung area to left lung area ratio (referred to as the area ratio measure) was calculated along with the standard deviation of the ratio. In addition, a regression line was constructed based on the relationship between the left lung area and the right lung area for these normal cases (step 93), as shown in FIG. 11. The average perpendicular distance from the regression line of each point corresponding to a normal case in this plot was calculated along with the standard deviation of that distance. A distance threshold from the regression line is used to determine the finding of abnormality. FIG. 12 shows the performance of the method with a ROC curve.

Also shown in FIG. 10 is the area analysis. The average pixel density is calculated for a number of regions in each lung contour (steps 104 and 105). The number and actual locations of the division of the areas can be empirically derived. The lung contours 90 of FIG. 9A have be divided to obtain lung contours 91 in FIG. 9B. In this example the number of regions was selected as three, and the location of the divisions are as shown. A density ratio is determined and compared to the density of normal cases (step 106). A regression line analysis similar to that described with respect to the area analysis is performed (step 107). The abnormality decision is based on a finding of abnormality in either of the area or density analysis (step 108).

Figure 13:
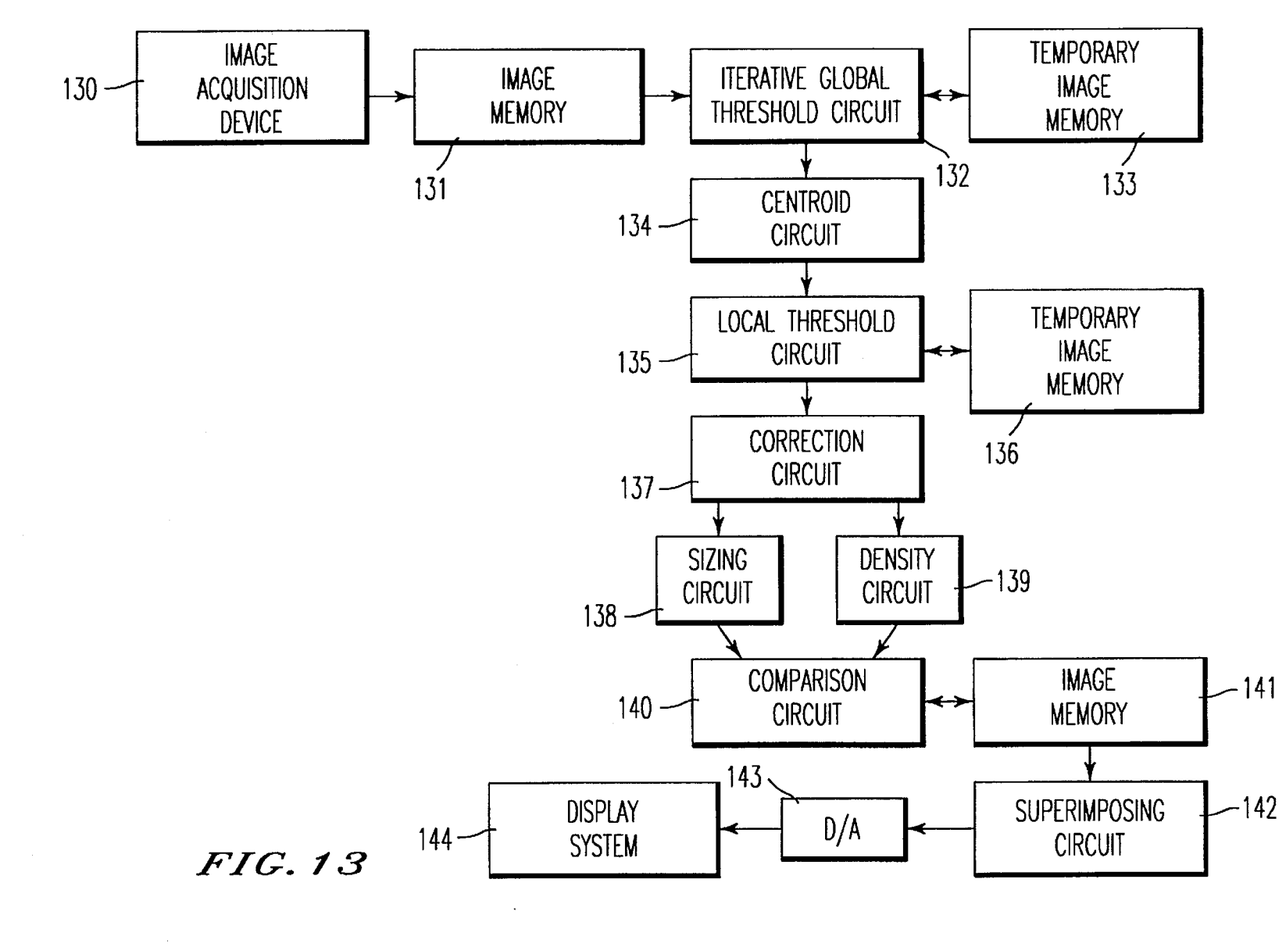
FIG. 13 is a schematic block diagram illustrating a system for implementing the automated method for the detection of gross abnormalities and asymmetries in chest images.

FIG. 13 is a more detailed schematic block diagram illustrating a system for implementing the method of the invention. Referring to FIG. 13, radiographic images of an object are obtained from an image acquisition device 130, such as an x-ray device and laser digitizer, and input to the system. Each chest image is digitized by device 130 and put into memory 131. The image data is first passed through the iterative global thresholding circuit 132, which utilizes temporary image memory 133 during the iterations, and then the image data undergoes centroid checking centroid analysis circuit 134 in order to determine the initial boundary of the aerated lung regions. The data is passed to the local thresholding circuit 135, which uses temporary memory 136 during the thresholding, and the correction circuit for the costo- and cardiophrenic angle 137 in order to determine the final boundary of each lung region. Image data within each lung region is passed to the sizing circuit 138 and the density-analysis circuit 139 in order to determine the area and density features for input to the comparison circuit 140. During the comparison of the aerated lung regions, the data is retained in image memory 141. In the superimposing circuit 142 the results are either superimposed onto chest images or given in text format. The results are then displayed on the display system 144 after passing through a digital-to-analog converter 143. The system according to the method can be implemented in both software and hardware, such as a programmed microprocessor or computer.

Obviously, numerous modifications and variations of the present invention are possible in light of the above technique. It is therefore to be understood that within the scope of the appended claims, the invention may be practiced otherwise than as specifically described herein. Although the current application is focused on gross abnormalities and asymmetries in chest, the concept can be expanded to the detection of abnormalities in other organs in the human body.

What is claimed as new and desired to be secured by Letters Patent of the United States is:

1. A method for detecting an abnormality in a radiographic image, comprising:
   obtaining a radiographic image of a subject;
   detecting a boundary of a feature in said radiographic image;
   determining geometric descriptors of said feature; and
   determining whether an abnormality exists using said geometric descriptors;
   wherein said step of detecting said boundary of said feature comprises:
      performing iterative global gray-level thresholding on said radiographic image, comprising,
      determining a plurality of gray-level theshold values
      iteratively creating respective binary images defining at least one region based on each of said plurality of said gray-level threshold values,
      defining a characteristic limit for said at least one region,
      eliminating said at least one region from the respective image and subsequent images iteratively obtained if said at least one region has a characteristic outside said characteristic limit, and
      determining a final region resulting after iterative eliminating of regions and iterative thresholding at said plurality of gray-level threshold values as said feature.

2. A method as recited in claim 1, wherein said step of performing iterative global gray-level thresholding comprises:
   constructing a gray-level histogram of said radiographic image;
   performing a running slope of said gray-level histogram to obtain a smoothed gray-level histogram; and
   determining a number of first gray-level threshold values at select locations in said smoothed gray-level histogram.

3. A method as recited in claim 1, wherein said step of iteratively creating said repective binary images comprisies turning on pixels in each iterative image having a gray level less than a respective one of said gray-level threshold values.

4. A method as recited in claim 1, comprising:
   said step of defining a characteristic limit comprising defining a centroid limit in said radiographic image; and
   said step of eliminating comprising eliminating said region if it has a centroid outside said centroid limit.

5. A method as recited in claim 1, comprising:
   performing a morphological open operation on selected ones of said binary images.

6. A method as recited in claim 1, comprising:
   using said binary images to create an initial boundary of said feature; and
   performing local gray-level thresholding using said initial boundary of said feature.

7. A method as recited in 6, wherein performing local gray-level thresholding comprises:
   placing regions-of-interest having a plurality of pixels along said initial boundary;
   determining a second gray-level threshold value for each of said regions-of-interest;
   selecting pixels in said regions-of-interest based upon respective ones of said second gray-level threshold values to obtain selected pixels; and
   forming a second binary image based upon said selected pixels.

8. A method as recited in claim 7, comprising:
   determining whether a first region-of-interest among said regions-of-interest is located on a first predetermined portion of said initial boundary;
   constructing a second gray-level histogram for pixels located within said first region-of-interest determined to be located on said predetermined portion of said initial boundary;
   determining said second gray-level threshold value for said first region-of-interest using said second gray-level histogram;
   determining whether a second region-of-interest among said regions-of-interest is located on a second predetermined portion of said initial boundary; and
   determining said second gray-level threshold value for said second region-of interest determined to be located on said second predetermined portion of said initial boundary based upon gray-level values of pixels located within said second region-of interest.

9. A method as recited in claim 8, wherein determining said second gray-level threshold value for said first region-of-interest comprises:

locating at least one minimum point in said second gray-level histogram; and selecting said second gray-level threshold value for said first region-of-interest as a gray-level value corresponding to said minimum point.

10. A method as recited in claim 9, comprising:

selecting said second gray-level threshold value for said first region-of-interest as a gray-level value corresponding to a minimum point in said second gray-level histogram having a greatest gray-level value.

11. A method as recited in claim 10, comprising:

selecting a third gray-level threshold value for said first region-of-interest as an average of said second gray-level threshold value for said first region-of-interest and gray-level threshold values for two regions-of-interest neighboring said first region-of-interest.

12. A method as recited in claim 7, comprising:

detecting a boundary of said second binary image;

performing a morphological open operation on said boundary; and superposing said boundary on said radiographic image.

13. A method as recited in claim 7, comprising:

detecting a boundary of said second binary image;

determining said geometric descriptors using said boundary of said second binary image;

detecting whether said abnormality exists using said geometric descriptors calculated using said boundary of said second binary image.

14. A method as recited in claim 1, wherein determining said geometric descriptors comprises:

determining an area of said boundary of said feature; and determining an average density of selected portions of said feature; and wherein determining whether said abnormality exists comprises:
       comparing said area of said boundary of said feature to an area determined for a normal feature; and
       comparing said average density for each of said portions of said feature to corresponding portions of a normal feature.

15. A method as recited in claim 14, wherein comparing said area and comparing said average density each comprises performing a regression line analysis.

16. A method for detecting an abnormality in a radiographic chest image, comprising:

obtaining a radiographic chest image of a subject;

detecting a boundary of lungs in said radiographic image;

determining geometric descriptors of said lungs;

determining whether an abnormality exists in said lungs using said geometric descriptors;

selectively positioning a first region-of-interest over the thorax in said radiographic chest image;

constructing a gray-level histogram using pixels in said first region-of-interest;

performing a running slope of said gray-level histogram to construct a smoothed gray-level histogram; and determining a number of first gray-level threshold values at selected locations in said smoothed gray-level histogram.

17. A method as recited in claim 16, comprising:

obtaining a radiographic chest image having a plurality of pixels;

determining horizontal gray-level profiles in said radiographic image; and determining lung apices and mediastinum locations using said horizontal gray-level profiles.

18. A method as recited in claim 16, further comprising:

creating respective binary images at each of said number of first gray-level threshold values; and detecting a region corresponding to said lungs using said binary images.

19. A method as recited in claim 18, comprising:

using said binary images to create an initial boundary of said lungs; and performing local gray-level thresholding using said initial boundary of said lungs.

20. A method as recited in 19, wherein performing local gray-level thresholding comprises:

placing regions-of-interest having a plurality of pixels along said initial boundary;

determining a second gray-level threshold value for each said region-of-interest;

selecting pixels in said regions-of-interest based upon respective ones of said second gray-level threshold values to obtain selected pixels; and forming a second binary image based upon said selected pixels.

21. A method as recited in claim 20, comprising:

placing a region-of-interest over a costophrenic angle of said lungs; and placing a region-of-interest over the cardiophrenic angle of said lungs.

22. A method as recited in claim 20, comprising:

determining whether a first region-of-interest among said region-of-interests is located on a lateral aspect of said lung;

constructing a second gray-level histogram for pixels located within said first region-of-interest determined to be located on said lateral aspect of said lung;

determining said second gray-level threshold value for said first region-of-interest using said second gray-level histogram;

determining whether a second region-of-interest among said region-of-interests is located on at least one of a medial and diaphragmatic aspects of said lungs; and determining said second gray-level threshold value for said second region-of-interest determined to be located on said second predetermined portion of said initial boundary based upon gray-level values of pixels located within said second region-of-interest.

23. A method as recited in claim 22, wherein determining said second gray-level threshold value for said first region-of-interest comprises:

locating a minimum in said second gray-level histogram; and selecting said second gray-level threshold value for said first region-of-interest as a gray-value corresponding to said minimum.

24. A method as recited in claim 23, comprising:

selecting said second gray-level threshold value for said first region-of-interest as a gray-level value corresponding to a minimum in said second gray-level histogram having a greatest gray-level value.

25. A method as recited in claim 20, comprising:

detecting a boundary of said second binary image;

determining said geometric descriptors using said boundary of said second binary image;

detecting whether said abnormality exists using said geometric descriptors calculated using said boundary of said second binary image.

26. A method as recited in claim 25, wherein determining said geometric descriptors comprises:

detecting right and left lung boundaries;

determining an area of said right lung boundary and an area of said left lung boundary;

dividing said each of said right and left lung boundaries into a selected number of portions; and determining an average density of pixels in each of said portions of said right and left lung boundaries;

and wherein determining whether said abnormality exists comprises:

determining a ratio of said area of said right lung boundary to said area of said left lung boundary;

comparing said ratio to a corresponding ratio determined for normal lungs; and comparing said average density for each of said portions of said right and left lung boundaries to a corresponding average densities of normal lungs.

27. A method as recited in claim 26, wherein comparing said ratio and comparing said average density each comprises performing a regression line analysis.

28. A method as recited in claim 27, comprising:

determining a regression line based upon said areas of said left and right lung boundaries and upon areas for normal left and right lungs;

determining a threshold of a distance for a point from said regression line using said areas for normal left and right lungs; and determining whether said abnormality exists based upon said threshold.

29. A method as recited in claim 27, comprising:

determining a regression line based upon said densities of said portions of said left and right lung boundaries and upon said corresponding densities of said normal lungs; and determining a threshold of a distance for a point from said regression line using said corresponding densities of said normal lungs; and determining whether said abnormality exists based upon said threshold.

30. A method as recited in claim 27, comprising:

determining a first regression line based upon said areas of said left and right lung boundaries and upon areas for normal left and right lungs;

determining a first threshold of a distance for a point from said regression line using said areas for normal left and right lungs;

determining a second regression line based upon said densities of said portions of said left and right lung boundaries and upon said corresponding densities of said normal lungs; and determining a second threshold of a distance for a point from said regression line using said corresponding densities of said normal lungs; and determining whether said abnormality exists based upon at least one of said first and second thresholds.

31. A system for detecting an abnormality in a radiographic image, comprising:

an image acquisition device;

an image memory connected to said image acquisition device;

an iterative global thresholding circuit connected to said image memory;

a centroid circuit connected to said iterative global threshold circuit;

a local thresholding circuit connected to said centroid circuit;

a correction circuit connected to said local thresholding circuit;

a sizing circuit connected to said correction circuit;

a density circuit connected to said correction circuit;

a comparison circuit connected to said sizing and density circuits; and a display connected to receive an input of said comparison circuit.

32. A system as recited in claim 31, wherein said iterative global thresholding circuit comprises:

means for constructing a gray-level histogram of said radiographic image;

means for performing a running slope of said gray-level histogram to obtain a smoothed gray-level histogram; and means for determining a number of first gray-level threshold values at selected locations in said smoothed gray-level histogram.

33. A system as recited in claim 31, wherein said iterative global thresholding circuit further comprises:

means for creating respective binary images at each of said number of first gray-level threshold values;

means for detecting a region corresponding to a feature in said radiographic image using said binary images; and means for using said binary images to create an initial boundary of said feature.

34. A system as recited in claim 33, wherein said local thresholding circuit comprises:

means for placing regions-of interest having a plurality of pixels along said initial boundary;

means for determining a second gray-level threshold value for each said region-of-interest;

means for selecting pixels in said regions-of-interest based upon respective ones of said second gray-level threshold values to obtain selected pixels; and means for forming a second binary image based upon said selected pixels.

35. A system as recited in claim 34, wherein said local thresholding circuit further comprises:

means for determining whether a first region-of-interest among said regions-of-interest is located on a first predetermined portion of said initial boundary;

means for constructing a second gray-level histogram for pixels located within said first region-of-interest determined to be located on said predetermined portion of said initial boundary;

means for determining said second gray-level threshold value for said first region-of-interest using said second gray-level histogram;

means for determining whether a second region-of-interest among said regions-of-interest is located on a second predetermined portion of said initial boundary; and means for determining said second gray-level threshold value for said second region-of-interest determined to be located on said second predetermined portion of said initial boundary based upon gray-level values of pixels located within said second region-of-interest.

36. A system as recited in claim 31, wherein:

said sizing circuit comprises means for determining an area of a boundary of said feature;

said density circuit comprises means for determining an average density of selected portions of said feature; and said comparison circuit comprises:

means for comparing said area of said boundary of said feature to an area determined for a normal feature; and means for comparing said average density for each of said portions of said feature to corresponding portions of a normal feature.

37. A system as recited in claim 36, wherein comparison circuit further comprises means for performing a regression line analysis.

38. A method for automated analysis of a radiographic image, comprising:

obtaining a radiographic image of a subject; and detecting a boundary of a feature in said radiographic image by performing iterative global gray-level thresholding on said radiographic image, comprising, determining a plurality of gray-level threshold values iteratively creating respective binary images defining at least one region based on each of said plurality of said gray-level threshold values, defining a characteristic limit for said at least one region, eliminating said at least one region from the respective image and subsequent images iteratively obtained if said at least one region has a characteristic outside said characteristic limit, and determining a final region resulting after iterative eliminating of regions and iterative thresholding at said plurality of gray level threshold values as said feature.

39. A method as recited in claim 38, wherein said step of iteratively creating said respective binary images comprises turning on pixels in each iterative image having a gray level less than a respective one of said gray-level threshold values.

40. A method as recited in claim 38, comprising:

said step of defining a characteristic limit comprising defining a centroid limit in said radiographic image; and said step of eliminating comprising eliminating said region if it has a centroid outside said centroid limit.

41. A method as recited in claim 38, comprising: performing a morphological open operation on selected ones of said binary images.

42. A method as recited in claim 38, comprising:

using said binary images to create an initial boundary of said feature; and performing local gray-level thresholding using said initial boundary of said feature.

43. A method as recited in claim 42, wherein performing local gray-level thresholding comprises:

placing regions-of interest having a plurality of pixels on said initial boundary;

determining a second gay-level threshold value for each said region-of-interest;

selecting pixels in said regions-of interest based upon respective ones of said second gray-level threshold values to obtain selected pixels; and forming a second binary image based upon said selected pixels.

44. A method as recited in claim 43, comprising:

determining whether a first region-of-interest among said region-of-interests is located on a first predetermined portion of said initial boundary;

constructing a second gray-level histograms for pixels located within said first region-of interest determined to be located on said predetermined portion of said initial boundary;

determining said second gray-level threshold value for said first region-of-interest using said second gray-level histogram;

determining whether a second region-of-interest among said region-of-interests is located on a second predetermined portion of said initial boundary; and determining said secondary gray-level threshold value for said second region-of-interest determined to be located on said second predetermined portion of said initial boundary based upon gray-level values of pixels located within said second region-of interest.

45. A method as recited in claim 44, wherein determining said second gray-level threshold value for said first region-of-interest comprises:

locating at least one minimum point in said second gray-level histogram; and selecting said second gray-level threshold value for said first region-of-interest as a gray-value corresponding to said minimum.

46. A method as recited in claim 45, comprising:

selecting said second gray-level threshold value for said first region-of-interest as a gray-level value corresponding to a minimum in said second gray-level histogram having a greatest gray-level value.

47. A method as recited in claim 46, comprising:

selecting a third gray-level threshold value for said first region-of-interest as an average of said second gray-level threshold value for said first region-of interest and second gray-level values for two regions-of-interest neighboring said first region-of-interest.

48. A method as recited in claim 43, comprising:

detecting a boundary of said second binary image;

performing a morphological open operation on said boundary; and superposing said boundary on said radiographic image.

* * * * *